US012424103B2

(12) United States Patent
Cho

(10) Patent No.: US 12,424,103 B2
(45) Date of Patent: Sep. 23, 2025

(54) METHOD AND DEVICE FOR VEHICLE PLATOONING

(71) Applicant: HYUNDAI MOBIS CO., LTD., Seoul (KR)

(72) Inventor: Chang Ho Cho, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 212 days.

(21) Appl. No.: 17/846,106

(22) Filed: Jun. 22, 2022

(65) Prior Publication Data
US 2023/0010974 A1 Jan. 12, 2023

(30) Foreign Application Priority Data

Jul. 6, 2021 (KR) .................. 10-2021-0088423

(51) Int. Cl.
G08G 1/00 (2006.01)
G05D 1/00 (2006.01)

(52) U.S. Cl.
CPC ............ *G08G 1/22* (2013.01); *G05D 1/0295* (2013.01)

(58) Field of Classification Search
CPC ............................... G08G 1/22; G05D 1/0295
USPC ......................................................... 701/117
See application file for complete search history.

(56) References Cited

U.S. PATENT DOCUMENTS

| 9,940,840 | B1 | 4/2018 | Schubert et al. |
| 10,703,262 | B1 | 7/2020 | Hong |
| 2014/0316865 | A1* | 10/2014 | Okamoto ............ G05D 1/0293 |
| | | | 705/14.1 |
| 2016/0026187 | A1 | 1/2016 | Alam et al. |
| 2018/0113448 | A1 | 4/2018 | Nagda et al. |
| 2018/0279096 | A1 | 9/2018 | Wu et al. |
| 2021/0224701 | A1* | 7/2021 | Bloomquist ........ H04L 67/5651 |
| 2021/0232157 | A1* | 7/2021 | Dieckmann ............. G08G 1/22 |
| 2021/0335134 | A1* | 10/2021 | Park ..................... B60W 30/16 |
| 2022/0009524 | A1* | 1/2022 | Oba ..................... B60W 40/06 |
| 2023/0010974 | A1* | 1/2023 | Cho ...................... G05D 1/0295 |

FOREIGN PATENT DOCUMENTS

| CN | 107077133 A | 8/2017 | |
| CN | 112348617 A | 2/2021 | |
| DE | 10 2016 006 672 A1 | 12/2016 | |
| JP | 2019194871 A * | 11/2019 | ............ B60W 30/16 |
| KR | 10-2015-0109602 A | 10/2015 | |

(Continued)

OTHER PUBLICATIONS

English translation for JP-2019194871-A (Year: 2024).*

(Continued)

*Primary Examiner* — Mahmoud S Ismail
(74) *Attorney, Agent, or Firm* — NSIP Law

(57) ABSTRACT

A vehicle platooning method includes an information collection operation in which a leader vehicle in a platooning convoy platooning receives information from other vehicles in the platooning convoy and checks the other vehicles; and a determination operation in which, when a request for joining the platooning convoy is received from an external vehicle not participating in the platooning convoy, the leader vehicle receives information about the external vehicle and determines whether to approve the request for joining the platooning convoy. The external vehicle is notified of a result of and a reason for the determination.

17 Claims, 3 Drawing Sheets

(56) References Cited

FOREIGN PATENT DOCUMENTS

KR    10-2020-0121395 A    10/2020
SE          1550722 A1     1/2017

OTHER PUBLICATIONS

Extended European Search Report Issued on Sep. 22, 2022, in counterpart European Patent Application No. 22182527.6 (11 Pages in English).

Chinese Office Action Issued on Apr. 18, 2025, in Counterpart Chinese Patent Application No. 2022107671162 (13 Pages in English, 9 Pages in Chinese).

* cited by examiner

METHOD AND DEVICE FOR VEHICLE PLATOONING

CROSS-REFERENCE TO RELATED APPLICATION(S)

This application is based on and claims priority under 35 U.S.C. 119 to Korean Patent Application No. 10-2021-0088423, filed on Jul. 6, 2021, in the Korean Intellectual Property Office, the entire disclosure of which is herein incorporated by reference for all purposes.

BACKGROUND

1. Field

The present disclosure relates to a method and a device for vehicle platooning and, more specifically, to a technology about a method and a device for vehicle platooning, wherein, when an external vehicle makes a request for joining a platooning convoy in a platooning situation, may receive cargo information and passenger information of the external vehicle to determine whether to allow the external vehicle to join the platooning convoy, and, when the external vehicle joins the platooning convoy, vehicle arrangement may be determined to minimize damage in case of an accident.

2. Description of the Prior Art

A vehicle is a device for transporting people or cargo from one place to another by driving wheels. For example, a two-wheeled vehicle such as a motorcycle and a four-wheeled vehicle such as a sedan, as well as a train belong to the category of vehicle.

In order to increase the safety and convenience of users who use the vehicle, the development of technology for incorporating various sensors and electronic devices into the vehicle is accelerating.

In particular, a system that provides various functions (e.g., smart cruise control and lane keeping assistance) developed for a user's driving convenience is mounted on a vehicle.

Accordingly, so-called autonomous driving has become possible, in which the vehicle itself considers the external environment and travels on the road without a driver's manipulation.

In addition, the concept of platooning has been proposed as a technology related to vehicle driving.

Platooning may imply that a plurality of vehicles grouped into a group drive together to a specific destination while sharing driving information with each other and considering the external environment.

One platoon may include a leader vehicle and a follower vehicle. The leader vehicle is a vehicle that leads the platoon at the very top of the platoon, and the follower vehicle is a vehicle that follows the leader vehicle.

The follower vehicle in the platoon may maintain following the leader vehicle by using driving information of the leader vehicle (e.g., GPS coordinates, speed, route, direction, and braking information) transmitted through a vehicle-to-vehicle communication method, etc.

Accordingly, a driver of the follower vehicle may freely perform actions (e.g., smartphone manipulation or sleeping) other than driving indoors. By such platooning, the convenience of the driver may be increased and the efficiency of transportation may be increased.

Meanwhile, when an external vehicle (which is a vehicle that does not participate in platooning) requests joining a platooning convoy in a platooning situation, conventionally, the external vehicle may be allowed to join the platooning convoy provided that the destination is the same or the direction is the same direction regardless of cargo information and passenger information of the external vehicle. As a result, there was a risk that even a small accident may develop into a large-scale accident causing great damage.

The above descriptions regarding background technologies have been made only to help understanding of the background of the present disclosure, and are not to be deemed by those skilled in the art to correspond to already-known prior arts.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a vehicle platooning method includes an information collection operation in which a leader vehicle in a platooning convoy platooning receives information from other vehicles in the platooning convoy and checks the other vehicles; and a determination operation in which, when a request for joining the platooning convoy is received from an external vehicle not participating in the platooning convoy, the leader vehicle receives information about the external vehicle and determines whether to approve the request for joining the platooning convoy. The external vehicle is notified of a result of and a reason for the determination.

In the information collection operation, the leader vehicle may check information about a total number of vehicles participating in the platooning convoy, information about arrangement between the vehicles, information about cargo loaded on each vehicle of the vehicles, or passenger information of the vehicles.

The information about the external vehicle received by the leader vehicle in the determination operation may include loaded-cargo information, passenger information, and final destination information.

In the determination operation, the leader vehicle may: check a total number of vehicles participating in the platooning convoy assuming the external vehicle joins the platooning convoy; and approve joining of the external vehicle in the platooning convoy depending on whether the total number of vehicles is less than a reference value, and notify the external vehicle of refusal of the joining when the total number of vehicles is equal to or greater than the reference value.

In the determination operation, the leader vehicle may: check a total number of passengers in vehicles participating in the platooning convoy assuming the external vehicle joins the platooning convoy; calculate a seat occupancy rate based on the checked total number of passengers and a total number of seats of vehicles in the platooning convoy and the external vehicle; and approve the request for the joining of the external vehicle depending on whether the seat occupancy rate is less than a reference value, and notifies the external vehicle of refusal of the joining when the seat occupancy rate is equal to or higher than the reference value.

When the passengers are mobility disadvantaged persons including elderly and weak persons, children, and pregnant women, the seat occupancy rate may be calculated by applying a weight to each mobility disadvantaged person.

The mobility disadvantaged persons may be identified using ticket payment information.

When the joining of the external vehicle is approved in the determination operation, the external vehicle may be arranged in a position, in which density of the passengers is low, within the platooning convoy by an instruction of the leader vehicle.

In the determination operation, the leader vehicle may: check information about cargoes in vehicles of the platooning convoy assuming the external vehicle joins the platooning convoy; assign a unit value to each cargo of the cargoes according to a cargo value and a safety level through the checked cargo information; and approve the joining of the external vehicle in the platooning convoy depending on whether a final value, obtained by summing all of the unit values for the cargoes, is less than a reference value, and notifies the external vehicle of refusal of the joining when the final value is equal to or greater than the reference value.

When the joining of the external vehicle in the platooning convoy is approved in the determination operation, the external vehicle may be arranged in a position, in which density of cargo is low or a danger level is low, within the platooning convoy by an instruction of the leader vehicle.

The leader vehicle in the platooning convoy may transmit accident information to the other vehicles when a vehicle participating in the platooning convoy is in an accident.

When the leader vehicle is in an accident during the platooning, leader authority may be granted to another vehicle immediately following the leader vehicle departing from the platooning convoy.

When a vehicle in an intermediate position in the platooning convoy is in an accident during the platooning, leader authority may be granted to another vehicle immediately following the vehicle in the intermediate position departing from the platooning convoy.

When a rearmost vehicle in the platooning convoy is in an accident during the platooning, the leader vehicle may exclude, from the platooning convoy, only the rearmost vehicle which is in the accident.

In another general aspect, a vehicle platooning device includes an information collector configured to enable a leader vehicle in a platooning convoy platooning to receive and collect information from other vehicles in the platooning convoy; a communicator configured to receive, from an external vehicle not participating in the platooning convoy, a signal making a request for joining the platooning convoy and information about the external vehicle, transmit a signal for approval or refusal of joining the platooning convoy, and allow driving information of the leader vehicle to be shared by the other vehicles; and a controller configured to determine whether to approve or refuse the joining of the external vehicle in the platooning convoy using the information from the information collector and the signal from the communicator.

The device may further include a vehicle arranger configured to arrange the external vehicle within the platooning convoy when the controller approves the joining of the external vehicle into the platooning convoy.

When the joining of the external vehicle in the platooning convoy is approved or refused by the controller, the external vehicle may be notified, through a display unit of the vehicle, of a result of and a reason for approving or refusing the joining.

The information collector of the leader vehicle may be further configured to receive and check information about a total number of vehicles participating in the platooning, information about arrangement between the vehicles, information about cargo loaded on each vehicle, or passenger information.

The communicator of the leader vehicle may be further configured to receive loaded-cargo information, passenger information, and final destination information of the external vehicle that does not participate in the platooning.

Other features and aspects will be apparent from the following detailed description, the drawings, and the claims.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
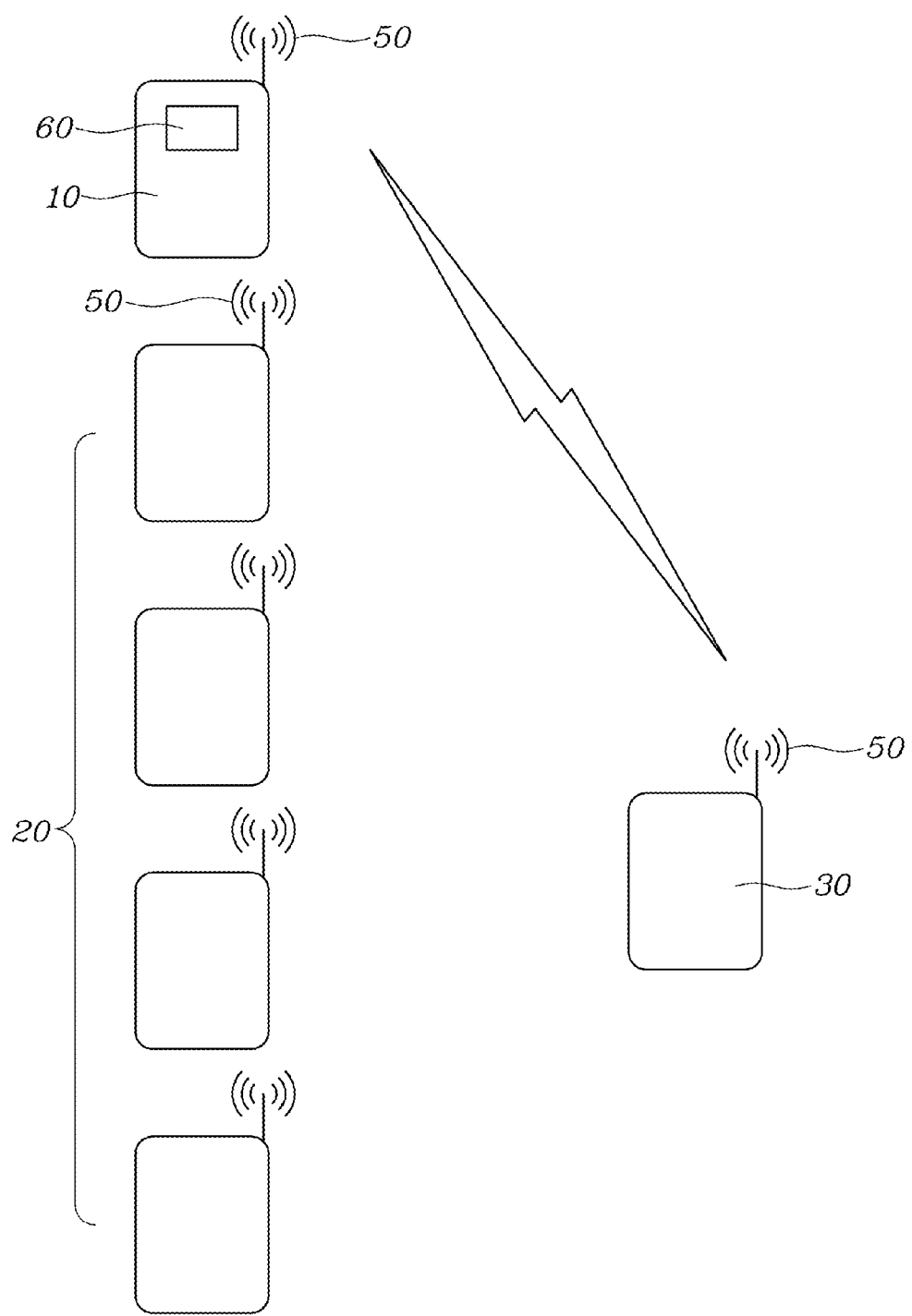
FIGS. 1 to 3 are a schematic configuration diagram, a block diagram, and a flowchart illustrating a method and a device for vehicle platooning according to the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the FIGURES is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure.

A control unit (controller) according to embodiments of the present disclosure may be implemented by a non-volatile memory (not shown) which is configured to store data pertaining to an algorithm configured to control operations of various vehicle components or software instructions for reproducing the algorithm, and a processor (not shown) which is configured to perform the operations as described below by using the data stored in the corresponding memory. Here, the memory and the processor may be implemented as individual chips. Alternatively, the memory and the processor may be implemented as an integrated single chip. The processor may be in the form of one or more processors.

Hereinafter, a method and a device for vehicle platooning according to a preferred embodiment of the present disclosure will be described with reference to the accompanying drawings 1 to 3.

In the present disclosure, when an external vehicle (a vehicle which does not participate in platooning) in a platooning situation makes a request for joining a platooning convoy, whether the external vehicle joins the platooning convoy may be determined by using information about vehicles participating in the platooning convoy (information about the number of vehicles, vehicle arrangement information, cargo information, passenger information, etc.) and information about the external vehicle (cargo information, passenger information, etc.), and when joining the platooning convoy, the external vehicle may be determined to be arranged in a position in which damage may be minimized even in case of an accident.

A vehicle platooning method according to the present disclosure may include an information collection operation in which a leader vehicle 10 in platooning receives information from vehicles 20 (follower vehicles) participating in the platooning and checks the platooning vehicles; and a determination operation in which, when a request for joining a platooning convoy is received from an external vehicle 30 which does not participate in the platooning, the leader vehicle 10 receives information about the external vehicle 30 and determines whether to approve joining the platooning convoy, wherein the external vehicle 30 is notified of the result of and a reason for the determination.

That is, when multiple vehicles perform platooning toward a specific destination (operation S1), the leader vehicle 10 in the platooning receives information from the vehicles 20 (follower vehicles) participating in the platooning and checks the platooning vehicles. The leader vehicle 10 may receive and check information about the total number of vehicles participating in the platooning, information about arrangement between the vehicles, information about cargo loaded on each vehicle, or passenger information (operation S2).

An information collector 40 of the leader vehicle 10 in the platooning may play the role of receiving and collecting information from the vehicles 20 participating in the platooning. The information collector 40 may be identically configured in all of the leader vehicle 10 in the platooning, the vehicles 20 (the follower vehicles) participating in the platooning, and the external vehicle 30.

Furthermore, each of the leader vehicle 10 and the vehicles 20 participating in the platooning may include a communication unit or communicator 50, and thus the leader vehicle 10 in platooning may receive information from the vehicles 20 participating in the platooning.

In addition, the external vehicle 30 may identically include a communication unit 50 capable of transmitting or receiving a signal.

During the platooning, the leader vehicle 10 may receive, through the communication unit 50, a signal making a request for joining a platooning convoy from the external vehicle 30 which does not participate in the platooning (operation S3)

When the leader vehicle 10 receives the signal making a request for joining the platooning convoy from the external vehicle 30, the leader vehicle 10 may receive information about the external vehicle 30 to determine whether to approve joining the platooning convoy (operation S4).

The information about the external vehicle 30, received by the leader vehicle 10, may include information about cargo loaded in the external vehicle 30, passenger information, and final destination information.

When the leader vehicle 10 receives the signal making a request for joining the platooning convoy from the external vehicle 30, a controller 60 of the leader vehicle 10 may check the total number of vehicles participating in the platooning, assuming that the external vehicle 30 joins a current platooning convoy (operation S5).

The controller 60 may be identically applied to all of the leader vehicle 10, the vehicles 20 participating in the platooning, and the external vehicle 30.

The leader vehicle 10 may approve joining of the external vehicle 30 in the platooning convoy only when the total number of the platooning vehicles, checked in operation S5, is less than a reference value (operation S6), and may notify the external vehicle 30 of refusal of the joining when the total number of the platooning vehicles is equal to or greater than the reference value (operation S7).

When the total number of the platooning vehicles is large, the risk of accidents with surrounding traveling vehicles may increase, and thus the total number of platooning vehicles may be limited to a certain number for safe driving.

When the joining of the external vehicle 30 in the platooning convoy is approved or refused by the controller 60, the external vehicle 30 may be notified of the result of and a reason for the approval or refusal of the joining through a display unit 70 of the vehicle, thereby aiding in safe driving.

The display unit 70 may be identically applied to all of the leader vehicle 10, the vehicles 20 participating in the platooning, and the external vehicle 30, and the display unit 70 may include all of a display for visual displaying, a sound device for aural displaying, etc.

Furthermore, when the leader vehicle 10 receives the signal making a request joining the platooning convoy from the external vehicle 30, the controller 60 of the leader vehicle 10 may check the total number of passengers in vehicles participating in the platooning, assuming that the external vehicle 30 joins a current platooning convoy (operation S8), and may calculate a seat occupancy rate by comparing the checked total number of passengers with the total number of seats of a vehicle joining the platooning convoy.

The leader vehicle 10 may approve joining of the external vehicle 30 in the platooning convoy only when the calculated seat occupancy rate is less than a reference value (operation S6), and may notify the external vehicle 30 of refusal of the joining when the seat occupancy rate is equal to or higher than the reference value (operation S7)

The total number of vehicle passengers may be checked using ticket payment information, and the seat occupancy rate may be checked using seat sensors.

When the total number of passengers in the platooning vehicles is large, the level of danger may be high in case of an accident, and thus there may be a risk of a larger-scale disaster. Therefore, the total number of passengers in platooning vehicles may be limited to a certain number for safety.

When the passengers in vehicles participating in the platooning are mobility disadvantaged persons including elderly and weak persons, children, and pregnant women, the seat occupancy may be calculated by applying a weight to each mobility disadvantaged person.

That is, in case of an accident, the mobility disadvantaged persons have a higher danger level in case of an accident than normal persons, and thus a weight may be applied for passenger safety, and a normal person may be counted as 1 (a number indicating one passenger) whereas a mobility disadvantaged person may be counted as a number greater than 1, whereby the vehicle seat ensuring rate may be further increased.

The mobility disadvantaged persons may be identified using ticket payment information.

When joining of the external vehicle 30 in the platooning convoy is approved as in operation S6 through operation S8, the external vehicle 30 may be arranged within the platooning convoy by an instruction of the leader vehicle 10 (operation S9). At this time, the external vehicle 30 may be arranged in a position, in which the density of passengers is lowest, within the platooning convoy.

Arranging the external vehicle 30 in a position having a lowest density of passengers is designed for the safety of passengers in case of an accident.

The arrangement of the external vehicle 30 may be performed under control of the controller 60 by a signal from a vehicle arrangement unit (vehicle arranger) 80 of the leader vehicle 10, and the vehicle arrangement unit 80 may be identically applied to all of the leader vehicle 10, the vehicles 20 participating in the platooning, and the external vehicle 30.

Furthermore, when the leader vehicle 10 receives a signal making a request for joining the platooning convoy from the external vehicle 30, the controller 60 of the leader vehicle 10 may check information about cargo in vehicles participating in the platooning, assuming that the external vehicle 30 joins a current platooning convoy, may assign a unit value to each cargo according to a cargo value and a safety level through the checked cargo information, and may obtain a final value by summing all of the unit values for the cargoes (operation S10)

The leader vehicle 10 may approve joining of the external vehicle 30 in the platooning convoy only when the final value obtained by summing all of the unit values for the cargoes is less than a reference value (operation S6), and may notify the external vehicle 30 of refusal of the joining when the final value is equal to or greater than the reference value (operation S7).

The leader vehicle 10 may assign, based on a cargo value and a safety level, unit values to all cargoes in vehicles participating in the platooning, assuming that the external vehicle 30 joins the current platooning convoy. After obtaining a final value by summing all of the unit values assigned to all cargoes, leader vehicle 10 may approve joining of the external vehicle 30 in the platooning convoy only when the final value is less than a reference value, and may notify the external vehicle 30 of refusal of the joining when the final value is equal to or greater than the reference value.

When the amount of cargo loaded in a vehicle is in excess of a reference, the risk of a large-scale disaster may increase in case of an accident. Therefore, the total number and weight of cargoes may be limited to a certain number for safety.

When the joining of the external vehicle 30 in the platooning convoy is approved as in operation S6 through operation S10, the external vehicle 30 may be arranged within the platooning convoy by the instruction of the leader vehicle 10 (operation S9). At this time, the external vehicle 30 may be arranged in a position, in which the density of cargo is low or a danger level is low, within the platooning convoy.

Arranging the external vehicle 30 in a position, in which the density of cargo is low or a danger level is low, is designed for the safety of passengers in case of an accident.

In accordance with the present disclosure, when a vehicle participating in the platooning is in an accident, the leader vehicle 10 in the platooning may transmit accident information to other vehicles, which is not involved in the accident, within the platooning convoy, thereby achieving safe driving. The transmission of the accident information may be performed through the communication unit 50 provided in the vehicle.

Furthermore, in the present disclosure, when the leader vehicle 10 is in an accident during the platooning, leader authority may be granted to a vehicle immediately following the leader vehicle 10 which departs from the platooning convoy and is in the accident.

The leader vehicle 10 which is in an accident may not serve as a leader any more, and thus may depart from the platooning convoy. New leader authority may be granted to a vehicle immediately following the leader vehicle 10 which is in the accident, thereby allowing the remaining vehicles, which are not involved in the accident, to continuously perform platooning.

Furthermore, in the present disclosure, when a vehicle in an intermediate position in the platooning convoy is in an accident during the platooning, leader authority may be granted to a vehicle immediately following the vehicle which departs from the platooning convoy and is in the accident.

When a vehicle in an intermediate position in the platooning convoy is in an accident during the platooning, the leader vehicle 10 may not serve as a leader for vehicles positioned behind the vehicle which is in the accident, and thus may depart from the platooning convoy. New leader authority may be granted to a vehicle immediately following the vehicle which is in the accident, thereby allowing the remaining vehicles, which are not involved in the accident, to continuously perform platooning.

Further, in the present disclosure, when a rearmost vehicle in the platooning convoy is in an accident during the platooning, the leader vehicle 10 may exclude, from the platooning convoy, only the rearmost vehicle which is in the accident, and thus the remaining vehicles which are not involved in the accident may continuously perform platooning.

In an embodiment of the present disclosure, the logic may be controlled such that operation S6 is performed only when all the conditions of operations S5, S8, and S10 are satisfied, or the logic may be controlled such that operation S6 is performed even when the conditions of operations S5, S8, and S10 are individually satisfied.

A vehicle platooning device according to the present disclosure may include: an information collector 40 configured to enable a leader vehicle 10 in platooning to receive and collect information from vehicles 20 participating in the platooning; a communication unit 50 configured to receive, from an external vehicle 30 which does not participate in the platooning, a signal making a request for joining a platooning convoy and information about the external vehicle, transmit a signal for approval or refusal of joining the platooning convoy, and allow driving information of the leader vehicle 10 to be shared by other vehicles 20 participating in the platooning; a controller 60 configured to determine whether to approve or refuse joining of the external vehicle 30 in the platooning convoy by using the information from the information collector 40 and the signal from the communication unit 50; and a vehicle arrangement unit 80 configured to arrange the external vehicle 30 within the platooning convoy when the controller 60 approves the joining of the external vehicle 30 in the platooning convoy.

Furthermore, when the joining of the external vehicle 30 in the platooning convoy is approved or refused by the controller 60, the external vehicle 30 may be notified, through a display unit 70 of the vehicle, of the result of and a reason for approving or refusing the joining.

The information collector 40, the communication unit 50, the controller 60, the display unit 70, and the vehicle arrangement unit 80 may be implemented in a control unit of each vehicle, and may be configured to perform relevant functions as necessary so that the present disclosure may be implemented.

As described above, an embodiment according to the present disclosure is advantageous in that, when the external vehicle 30 which does not participate in platooning in a platooning situation makes a request for joining a platooning convoy, whether the external vehicle 30 joins the platooning convoy may be determined by using information about vehicles participating in the platooning convoy (information about the number of vehicles, vehicle arrangement information, cargo information, passenger information, etc.) and information about the external vehicle 30 (cargo information, passenger information, etc.), and when joining the platooning convoy, the external vehicle 30 may be determined to be arranged in a position in which damage may be minimized even in case of an accident, thereby ensuring safety in the platooning.

The method and the device for vehicle platooning according to the present disclosure are advantageous in that, when an external vehicle which does not participate in platooning in a platooning situation makes a request for joining a platooning convoy, whether the external vehicle joins the platooning convoy may be determined by using information about vehicles participating in the platooning convoy (information about the number of vehicles, vehicle arrangement information, cargo information, passenger information, etc.) and information about the external vehicle (cargo information, passenger information, etc.), and when joining the platooning convoy, the external vehicle may be determined to be arranged in a position in which damage may be minimized even in case of an accident, thereby ensuring safety in the platooning.

Figure 2:
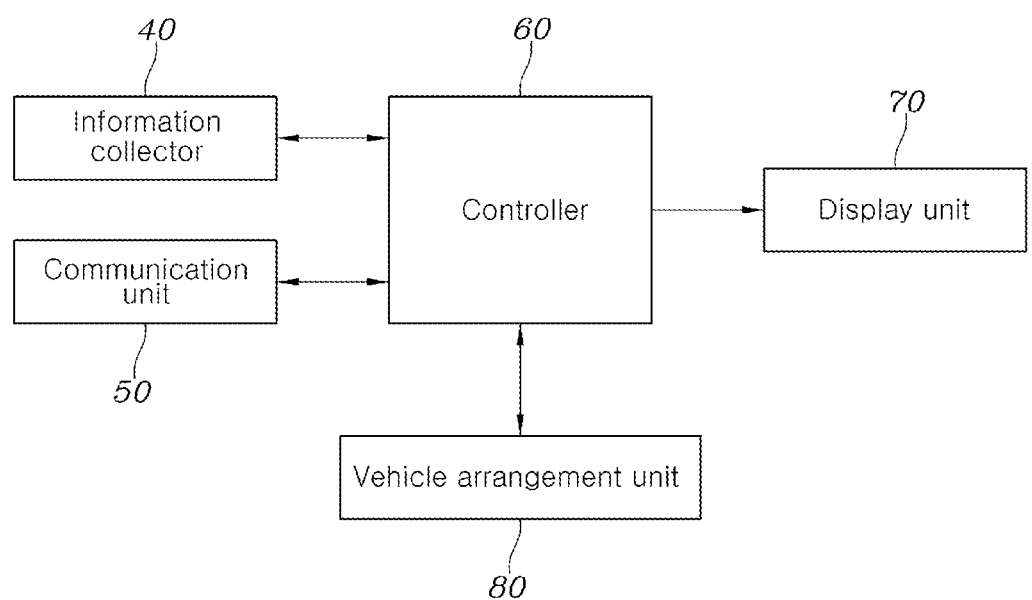
Figure 3:
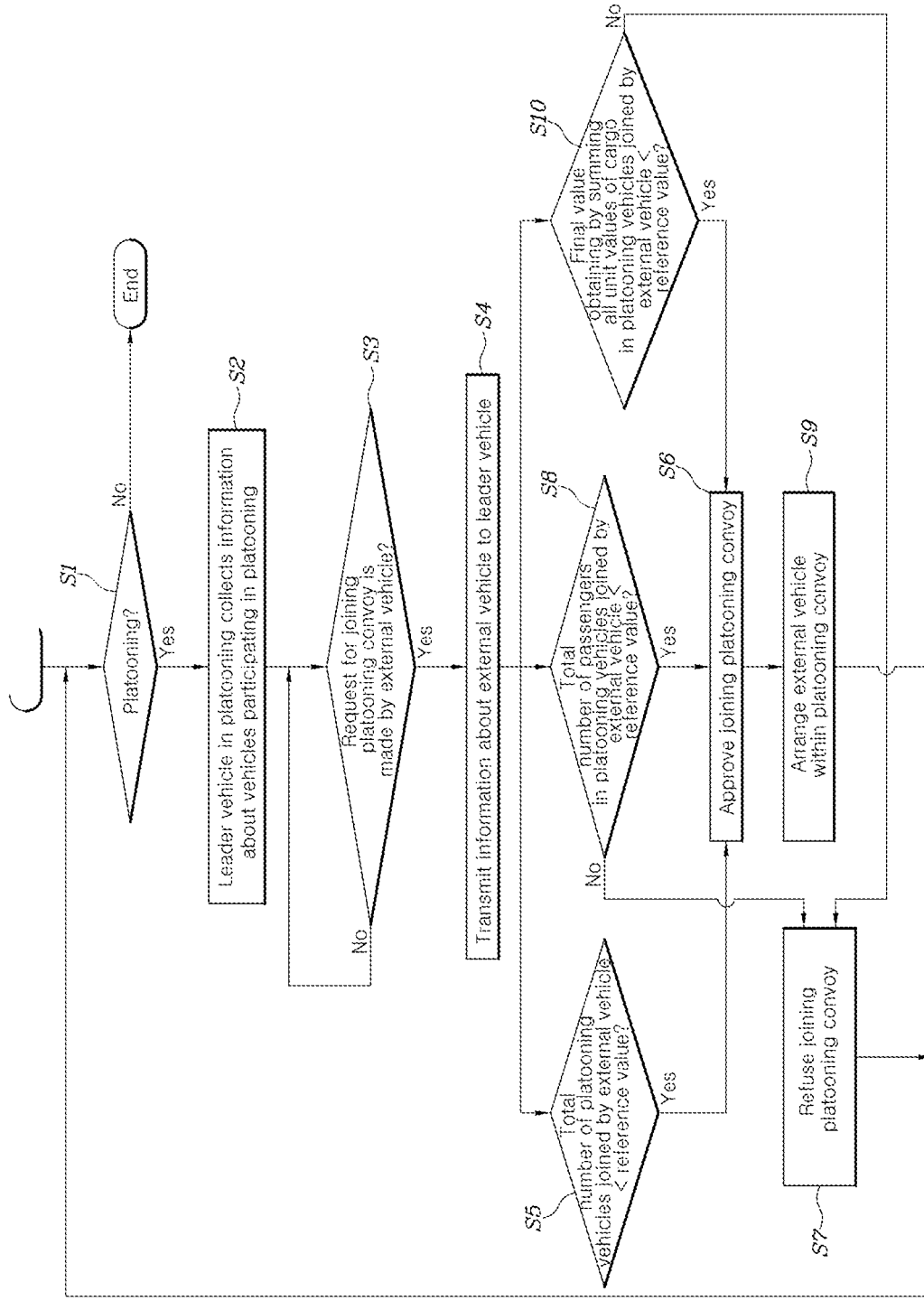

The information collector, communication unit, controller, vehicle arrangement unit, display unit in FIGS. 1-3 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-3 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented vehicle platooning method comprising:
    an information collection operation in which a leader vehicle in a platooning convoy receives information from other vehicles in the platooning convoy and checks the other vehicles; and
    a determination operation in which, when a request for joining the platooning convoy is received from an external vehicle not participating in the platooning convoy, the leader vehicle receives information about the external vehicle and determines whether to approve the request for joining the platooning convoy,
    wherein the external vehicle is notified of a result of and a reason for the determination, by transmitting a signal to the external vehicle that is displayed on a display unit of the external vehicle, and
    wherein, in the determination operation, the leader vehicle:
    checks a total number of passengers in vehicles participating in the platooning convoy assuming the external vehicle joins the platooning convoy;
    calculates a seat occupancy rate, using seat sensors, based on the checked total number of passengers and a total number of seats of vehicles in the platooning convoy and the external vehicle; and
    approves the request for the joining of the external vehicle when the seat occupancy rate is less than a reference value and arranges the external vehicle within the platooning convoy by an instruction of the leader vehicle such that the external vehicle is arranged in a position within the platooning convoy in which a density of passengers is lowest, and notifies the external vehicle of refusal of the joining when the seat occupancy rate is equal to or higher than the reference value.

2. The processor-implemented method of claim 1, wherein, in the information collection operation, the leader vehicle checks information about a total number of vehicles participating in the platooning convoy, information about arrangement between the vehicles, information about cargo loaded on each vehicle of the vehicles, or passenger information of the vehicles.

3. The processor-implemented method of claim 1, wherein the information about the external vehicle received by the leader vehicle in the determination operation comprises loaded-cargo information, passenger information, and final destination information.

4. The processor-implemented method of claim 1, wherein, in the determination operation, the leader vehicle:
   checks a total number of vehicles participating in the platooning convoy assuming the external vehicle joins the platooning convoy; and
   approves joining of the external vehicle in the platooning convoy depending on whether the total number of vehicles is less than a reference value, and notifies the external vehicle of refusal of the joining when the total number of vehicles is equal to or greater than the reference value.

5. The processor-implemented method of claim 1, wherein, when the passengers are mobility disadvantaged persons comprising elderly and weak persons, children, and pregnant women, the seat occupancy rate is calculated by applying a weight to each mobility disadvantaged person.

6. The processor-implemented method of claim 5, wherein the mobility disadvantaged persons are identified using ticket payment information.

7. The processor-implemented method of claim 1, wherein, in the determination operation, the leader vehicle:
   checks information about cargoes in vehicles of the platooning convoy assuming the external vehicle joins the platooning convoy;
   assigns a unit value to each cargo of the cargoes according to a cargo value and a safety level through the checked cargo information; and
   approves the joining of the external vehicle in the platooning convoy depending on whether a final value, obtained by summing all of the unit values for the cargoes, is less than a reference value, and notifies the external vehicle of refusal of the joining when the final value is equal to or greater than the reference value.

8. The processor-implemented method of claim 7, wherein, when the joining of the external vehicle in the platooning convoy is approved in the determination operation, the external vehicle is arranged in a position, in which density of cargo is low or a danger level is low, within the platooning convoy by an instruction of the leader vehicle.

9. The processor-implemented method of claim 1, wherein the leader vehicle in the platooning convoy transmits accident information to the other vehicles when a vehicle participating in the platooning convoy is in an accident.

10. The processor-implemented method of claim 1, wherein, when the leader vehicle is in an accident during the platooning, leader authority is granted to another vehicle immediately following the leader vehicle departing from the platooning convoy.

11. The processor-implemented method of claim 1, wherein, when a vehicle in an intermediate position in the platooning convoy is in an accident during the platooning, leader authority is granted to another vehicle immediately following the vehicle in the intermediate position departing from the platooning convoy.

12. The processor-implemented method of claim 1, wherein, when a rearmost vehicle in the platooning convoy is in an accident during the platooning, the leader vehicle excludes, from the platooning convoy, only the rearmost vehicle which is in the accident.

13. A vehicle platooning device comprising:
   one or more processors, the one or more processors being configured to:
   enable a leader vehicle in a platooning convoy to receive and collect information from other vehicles in the platooning convoy;
   receive, from an external vehicle not participating in the platooning convoy, a signal making a request for joining the platooning convoy and information about the external vehicle, transmit a signal for approval or refusal of joining the platooning convoy, and allow driving information of the leader vehicle to be shared by the other vehicles;
   determine whether to approve or refuse the joining of the external vehicle in the platooning convoy using the information from other vehicles in the platooning convoy and the signal;
   check a total number of passengers in vehicles participating in the platooning convoy assuming the external vehicle joins the platooning convoy;
   calculate a seat occupancy rate, using seat sensors, based on the checked total number of passengers and a total number of seats of vehicles in the platooning convoy and the external vehicle; and
   approve the request for the joining of the external vehicle when the seat occupancy rate is less than a reference value and arrange the external vehicle within the platooning convoy by an instruction of the leader vehicle such that the external vehicle is arranged in a position within the platooning convoy in which a density of passengers is lowest, and notify the external vehicle of refusal of the joining when the seat occupancy rate is equal to or higher than the reference value,
   wherein, when the joining of the external vehicle in the platooning convoy is approved or refused, the one or more processors are configured to notify the external vehicle, by transmitting a signal to the external vehicle that is displayed on a display unit of the external vehicle, of a result of and a reason for approving or refusing the joining.

14. The device of claim 13, wherein the one or more processors are configured to arrange the external vehicle within the platooning convoy when the joining of the external vehicle into the platooning convoy is approved.

15. The device of claim 13, wherein the one or more processors are configured to receive and check information about a total number of vehicles participating in the platooning, information about arrangement between the vehicles, information about cargo loaded on each vehicle, or passenger information.

16. The device of claim 13, wherein the one or more processors are configured to receive loaded-cargo information, passenger information, and final destination information of the external vehicle that does not participate in the platooning.

17. A vehicle platooning device comprising:
one or more processors, the one or more processors being configured to:
enable a leader vehicle in a platooning convoy to receive and collect information from other vehicles in the platooning convoy;
receive, from an external vehicle not participating in the platooning convoy, a signal making a request for joining the platooning convoy and information about the external vehicle, transmit a signal for approval or refusal of joining the platooning convoy, and allow driving information of the leader vehicle to be shared by the other vehicles;
determine whether to approve or refuse the joining of the external vehicle in the platooning convoy using the information from other vehicles in the platooning convoy, including a seat occupancy rate obtained by using seat sensors, and the signal, and notify the external vehicle, by transmitting a signal to the external vehicle that is displayed on a display unit of the external vehicle, of a result of and a reason for approving or refusing the joining, such that when it is approved for the external vehicle to join the platooning convoy, the external vehicle is arranged within the platooning convoy, by an instruction of the leader vehicle, in a position in which a density of passengers is lowest; and
when a rearmost vehicle in the platooning convoy is in an accident during the platooning, exclude, from the platooning convoy, only the rearmost vehicle which is in the accident.

\* \* \* \* \*